United States Patent
Ries et al.

(10) Patent No.: US 8,858,117 B2
(45) Date of Patent: Oct. 14, 2014

(54) PNEUMATIC COMPACTOR WEIGHT SENSING SYSTEM

(71) Applicant: Caterpillar Paving Products Inc., Minneapolis, MN (US)

(72) Inventors: Michael W. Ries, Coon Rapids, MN (US); Mark L. Norton, Eden Prairie, MN (US); Timothy J. Lindholm, Blaine, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 55 days.

(21) Appl. No.: 13/770,172

(22) Filed: Feb. 19, 2013

(65) Prior Publication Data

US 2014/0079484 A1  Mar. 20, 2014

Related U.S. Application Data

(60) Provisional application No. 61/701,953, filed on Sep. 17, 2012.

(51) Int. Cl.
| | | |
|---|---|---|
| *G01G 19/02* | (2006.01) | |
| *E01C 23/06* | (2006.01) | |
| *E01C 19/27* | (2006.01) | |
| *G01G 19/08* | (2006.01) | |

(52) U.S. Cl.
CPC .............. *G01G 19/08* (2013.01); *E01C 19/27* (2013.01)

USPC .......................... 404/84.1; 404/128; 177/136

(58) Field of Classification Search
USPC .................... 404/84.1, 128; 177/136
See application file for complete search history.

(56) References Cited

U.S. PATENT DOCUMENTS

| | | | | |
|---|---|---|---|---|
| 3,306,383 | A * | 2/1967 | Saxton et al. ................. | 177/136 |
| 4,832,141 | A   | 5/1989 | Perini et al. | |
| 5,119,895 | A * | 6/1992 | Gradert ......................... | 177/208 |
| 5,478,974 | A * | 12/1995 | O'Dea ....................... | 177/25.14 |
| 6,307,164 | B1 * | 10/2001 | Campbell ..................... | 177/141 |
| 7,612,303 | B1 * | 11/2009 | Floyd ............................ | 177/141 |
| 2013/0103268 | A1 * | 4/2013 | Norton et al. .................. | 701/50 |

FOREIGN PATENT DOCUMENTS

| | | |
|---|---|---|
| GB | 2444277 | 6/2008 |
| WO | 2011110524 | 9/2011 |

* cited by examiner

*Primary Examiner* — Gary Hartmann

(57) ABSTRACT

A weight sensing system for a pneumatic compactor is provided. The weight sensing system includes a pressure sensor in communication with a pneumatic cylinder. The pressure sensor is configured to generate a signal indicative of a pressure exerted on the pneumatic cylinder. Further, a controller is communicably coupled to the pressure sensor. The controller is configured to receive the signal indicative of the pressure exerted on the pneumatic cylinder. The controller is also configured to determine a compaction weight of the pneumatic compactor based on the received signal, a weight distribution on the pneumatic compactor, and a fixed volume of the pneumatic cylinder.

20 Claims, 4 Drawing Sheets

US 8,858,117 B2

PNEUMATIC COMPACTOR WEIGHT SENSING SYSTEM

CLAIM FOR PRIORITY

The present application claims priority from U.S. Provisional Application Ser. No. 61/701,953, filed on Sep. 17, 2012, which is fully incorporated herein.

TECHNICAL FIELD

The present disclosure relates to pneumatic compactor machines, and more particularly, to an apparatus for sensing the weight of the pneumatic compactor during its operation at various ballasts and ground conditions.

BACKGROUND

Compactor machines, also variously called compactors and compaction machines, are frequently employed for compacting dirt, gravel, asphalt and other compactable surfaces associated with roadbed and other land areas. One such type of compaction machine is a pneumatic wheel roller-style of compactor, which is dependent upon tire pressure for achieving effective compaction. For successful operation of the pneumatic compactor, the ground contact pressures should be managed in accordance with compaction surface type.

Typically, an operator estimates a contact pressure based upon weight of the machine, air pressure of the tires, and compaction conditions in accordance with a chart provided by the machine manufacturer. Overall weight of the machine may be controlled by adding ballast such as sand and/or water, according to a specific ground compaction task. However, inaccurate estimates of proper tire pressures for given compaction surface conditions and types may degrade the compactor's performance.

Accordingly, it would be beneficial to provide a system for automatically sensing the weight of the pneumatic compactor so that the operator is aware of the weight of the machine during operation.

SUMMARY OF THE DISCLOSURE

In one aspect of the present disclosure, a weight sensing system for a pneumatic compactor is provided. The weight sensing system includes a pressure sensor in communication with a pneumatic cylinder. The pressure sensor is configured to generate a signal indicative of a pressure exerted on the pneumatic cylinder. Further, a controller is communicably coupled to the pressure sensor. The controller is configured to receive the signal indicative of the pressure exerted on the pneumatic cylinder. The controller is also configured to determine a compaction weight of the pneumatic compactor based on the received signal, a weight distribution on the pneumatic compactor, and a fixed volume of the pneumatic cylinder.

In another aspect, a method is provided. The method provides a pressure sensor in communication with a pneumatic cylinder. The method receives, from the pressure sensor, a signal indicative of a pressure exerted on the pneumatic cylinder. Further, the method determines a compaction weight of a pneumatic compactor based, at least in part, on the received signal, a weight distribution on the pneumatic compactor, and a fixed volume of the pneumatic cylinder.

In yet another aspect, a pneumatic compactor is provided. The pneumatic compactor includes a power source and a pair of front and rear suspension tires. A pair of pneumatic cylinders is associated with each of the pair of front and rear suspension tires. Further, a pressure sensor is provided in communication with at least one of the pair of the pneumatic cylinders. The pressure sensor is configured to generate a signal indicative of a pressure exerted on the pneumatic cylinder. A controller is communicably coupled to the pressure sensor. The controller is configured to receive the signal indicative of the pressure exerted on the pneumatic cylinder. The controller is configured to determine a compaction weight of the pneumatic compactor based, at least in part, on the received signal, a weight distribution on the pneumatic compactor, and a fixed volume of the pneumatic cylinder. Further, a display unit is configured to display the determined compaction weight of the pneumatic compactor.

Other features and aspects of this disclosure will be apparent from the following description and the accompanying drawings.

DETAILED DESCRIPTION

Figure 1:
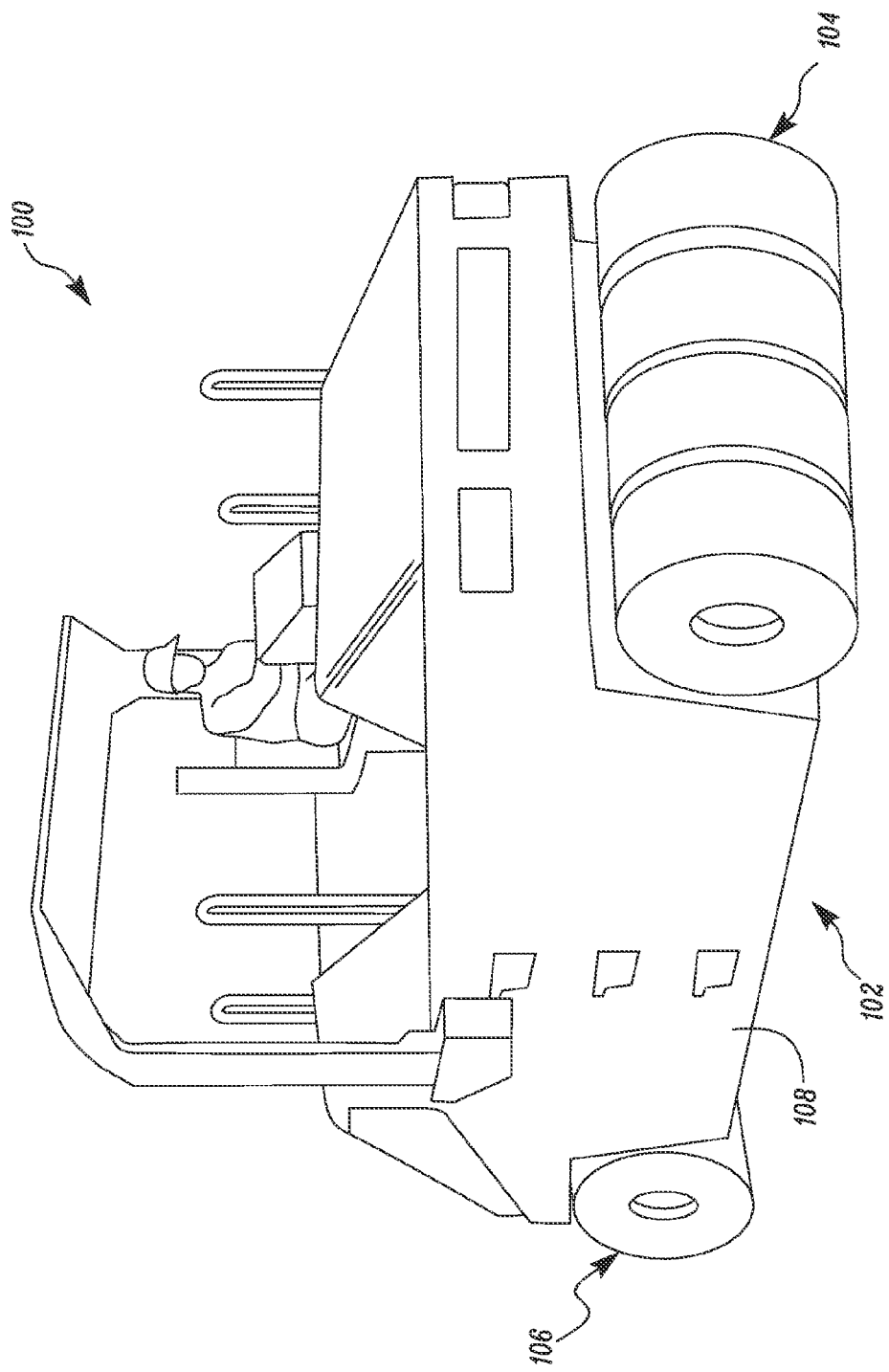
FIG. 1 is a perspective view of a pneumatic compactor machine, according to one embodiment of the present disclosure.

Wherever possible, the same reference numbers will be used throughout the drawings to refer to the same or the like parts. FIG. 1 represents an exemplary machine 100, according to one embodiment of the present disclosure. More specifically, the machine 100 is a pneumatic compactor 102 as shown in the illustrated embodiment.

The pneumatic compactor 102 may be useful for compacting and/or increasing density of a compaction surface, such as dirt, gravel, and/or bituminous mixtures. The pneumatic compactor 102 has sets of compacting wheels containing pneumatically inflated front and rear suspension tires 104, 106, both the front and the rear suspension tires 104, 106 being rotatably mounted on a main frame 108 of the pneumatic compactor 102.

It will be appreciated by those skilled in the art that actual performance of the pneumatic compactor 102 can vary as a function of tire inflation pressure and softness or hardness of the surface being compacted. Thus, low tire inflation pressures will generally improve traction and durability of the pneumatic compactor 102 on softer ground. On the other hand, higher tire inflation pressures may be known to provide more efficient results on firmer surfaces. It should be noted that to the extent that the compaction surface may be softer and of lower density in early stages of the compaction process, the compaction surface may become increasingly denser. Accordingly, this may make the compaction surface relatively more firm after several passes of the pneumatic compactor 102 over the compaction surface.

The main frame 108 of the pneumatic compactor 102 may also support ballast or a ballast tank (not shown) for providing an additional weight to the pneumatic compactor 102. The additional weight, hereinafter referred to as ballast weight, may be added in accordance with and/or to meet surface compaction demands. The ballast weight can include sand or water, or other substances like liquid antifreeze solutions that are added to the ballast tank.

Pressure acting on the compaction surface by the pneumatic compactor 102 may be based on an effective weight of the pneumatic compactor 102 which is exerted on the compaction surface. This effective weight, hereinafter referred to as compaction weight, may vary based on various factors. The present disclosure relates to a controller 302 (see FIG. 3) configured to determine the compaction weight of the pneumatic compactor 102 which may change dynamically due to any added loads such as the ballast weight or an operator.

Figure 2:
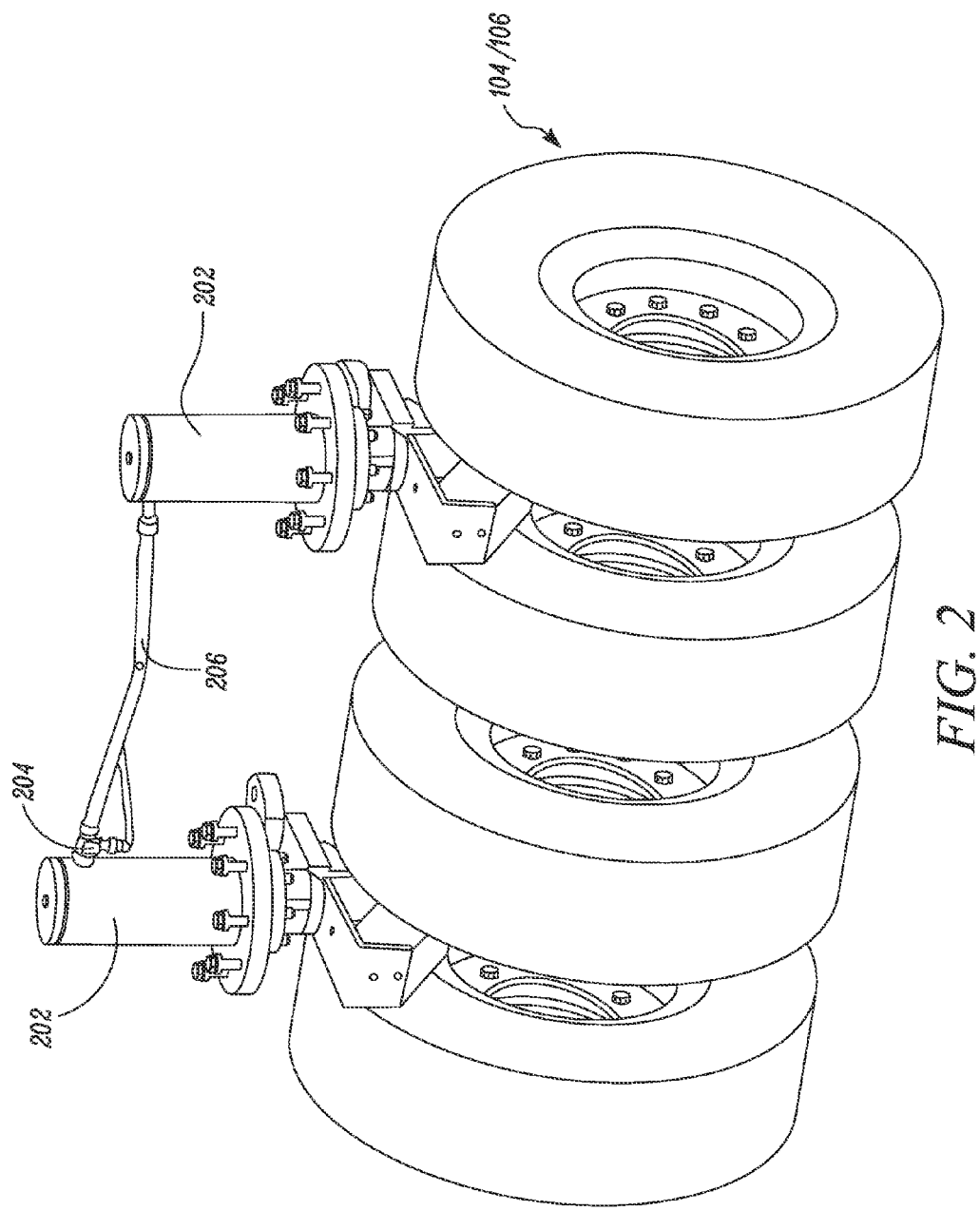
FIG. 2 is a perspective view of any one of the front or rear suspension tires of the pneumatic compactor.

FIG. 2 illustrates any one of the front and rear suspension tires 104, 106 of the pneumatic compactor 102. It should be noted that the set of front and rear suspension tires 104, 106 of the pneumatic compactor 102 may be structurally and operatively equivalent, or in some instances, the size and structure of the front and rear tires 104, 106 may deviate from each other. In general, all aspects of the described operability and functional effects will apply with equal force, whether or not the front tire set 104 differs from the rear tire set 106.

Each of the pair of the tires 104, 106 is connected to a pneumatic cylinder 202 having a fixed volume. A person of ordinary skill in the art will appreciate that the tires 104, 106 may be pneumatically inflated via the pneumatic cylinders 202. As can be seen in the accompanying figures, a pressure sensor 204 is provided in a tie-line 206 connecting each of the pair of pneumatic cylinders 202. The pressure sensor 204 is configured to generate a signal indicative of a pressure exerted on the pneumatic cylinders 202 associated with the any of the front and the rear suspension tires 104, 106 of the pneumatic compactor 102. Preferably, the pressure sensor 204 is provided in connection with the front suspension tires 104 of the pneumatic compactor 102.

Figure 3:
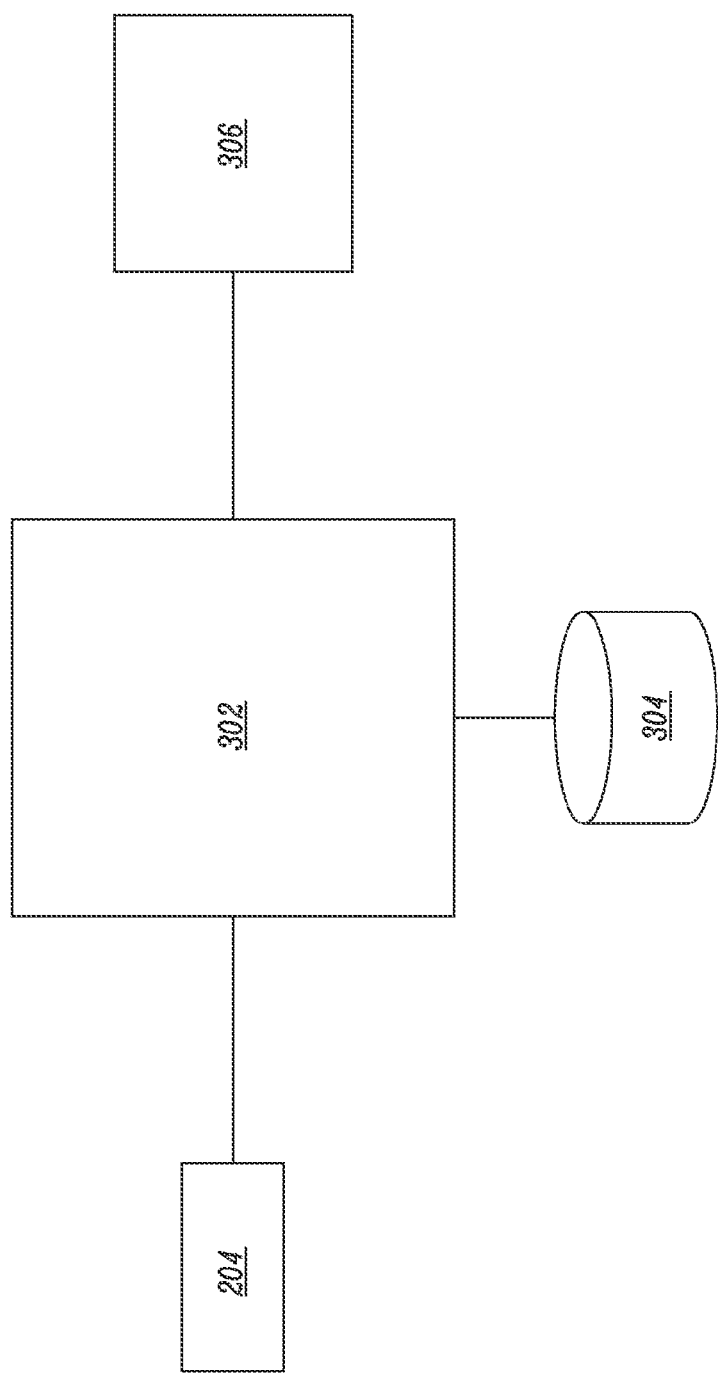
FIG. 3 is a block diagram of a weight sensing system embodied in the pneumatic compactor machine of FIG. 1.

Referring to FIG. 3, the pressure sensor 204 may be communicably coupled to the controller 302. In one example, a harness may be used to connect the pressure sensor 204 located at the front suspension tires 104 of the pneumatic compactor 102 to the controller 302 located at a rear end of the pneumatic compactor 102. The controller 302 is configured to receive the signal indicative of the pressure exerted on the pneumatic cylinders 202. Further, the controller 302 is configured to determine the compaction weight of the pneumatic compactor 102 based on the received signal, a weight distribution on the pneumatic compactor 102, and the fixed volume of the pneumatic cylinder 202.

The weight distribution of the pneumatic compactor 102 may be based on the ballast weight, the fixed weight of the pneumatic compactor 102, the weight of the operator, and the like. Referring to FIG. 3, the controller 302 may be communicably coupled to a database 304. The database 304 may include any conventional or non-conventional database known in the art. Further, the database 304 may either be intrinsic or extrinsic to the controller 302. Parameters like the fixed volume of the pneumatic cylinder 202 and/or the fixed weight of the pneumatic compactor 102 may be stored in the database 304.

Alternatively, the fixed weight of the pneumatic compactor 102, the ballast weight, the fixed volume of the pneumatic cylinder 202, and the like may be input to the controller 302 via an input device (not shown). The input device may include a control panel, a touchscreen, or any other device known in the art for receiving the mentioned machine statistics from the operator. In another embodiment, the controller 302 may be coupled to an electronic control module or any other sensors from which the machine statistics may be received or computed based on measured signals.

Further, the database 304 may be configured to store a pre-calibrated reference map including the pre-calculated compaction weights for one or more pressure readings, weight distribution readings, and volume of the pneumatic cylinder 202 readings. The controller 302 may be configured to determine the compaction weight of the pneumatic compactor 102 by correlation of the received signal from the pressure sensor 204 and the pre-calibrated reference map. Accordingly, the controller 302 may look up the reference map and retrieve the compaction weight of the pneumatic compactor 102 from the database 304.

In one embodiment, the controller 302 may compute the compaction weight of the pneumatic compactor 102 based on a known mathematical function or equation relating the pressure exerted on the pneumatic cylinders 202, the weight distribution on the pneumatic compactor 102, and the fixed volume of the pneumatic cylinder 202. Additionally, in another embodiment, the controller 302 is configured to determine a number of passes required to be made by the pneumatic compactor 102 to achieve a target degree of compaction of the compaction surface, based on the determined compaction weight of the pneumatic compactor 102. One of ordinary skill in the art will appreciate that the target degree of compaction may vary based on the compaction surface type. It should be noted that the compaction weight and/or the required number of passes may be determined based one real-time monitoring of the pressure exerted on the pneumatic cylinders 202. Alternatively, the controller 302 may be manually activated to determine the compaction weight and/or the required number of passes based on a user command.

Referring to FIG. 3, a display unit 306 may be communicably coupled to the controller 302. The display unit 306 may be present in an operator station of the pneumatic compactor 102. The display unit 306 may be configured to dynamically display the compaction weight of the pneumatic compactor 102 which is determined by the controller 302. In one embodiment, the required number of passes may also be displayed to the operator via the display unit 306.

The controller 302 may embody a single microprocessor or multiple microprocessors that include a means for receiving input from the pressure sensor 204 in order to determine the compaction weight of the pneumatic compactor 102. Numerous commercially available microprocessors may be configured to perform the functions of the controller 302. It should be appreciated that the controller 302 may readily embody a general machine microprocessor capable of controlling numerous machine functions. A person of ordinary skill in the art will appreciate that the controller 302 may additionally include other components and may also perform other functionality not described herein. Further, the connections and sensors described herein are merely on an exemplary basis and do not limit the scope of the disclosure.

Figure 4:
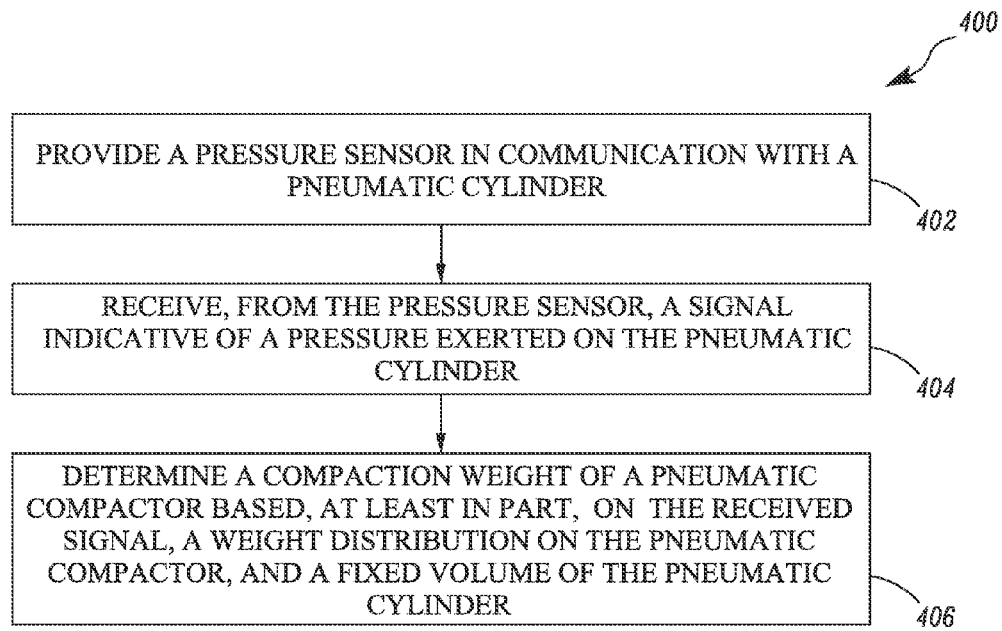
FIG. 4 is a flowchart of a method for sensing a compaction weight of the pneumatic compactor machine.

A method for determining the compaction weight of the pneumatic compactor 102 will be described in detail in connection with FIG. 4.

INDUSTRIAL APPLICABILITY

In operation, the pneumatic compactor machine may be used to compact the compaction surface, such as an asphalt roadbed, a dirt landfill, or an underlayment of crushed gravel for an airport runway. Often times the operator running the machine may not be aware of a total weight of the machine that is exerted on the compaction surface. This may result in inefficient use of the machine requiring multiple passes to obtain asphalt or soil densities if the machine is not weighted properly for the application. Moreover, incorrect weighting of the machine may cause either less or extra compactness of the compaction surface than what is required.

As described above, the present disclosure may prove useful in allowing the operator to accurately know the compaction weight of the pneumatic compactor 102. In one embodiment, the controller 302 may also determine the number of passes the operator must make to properly compact the soil or asphalt being worked on. This may be helpful in increasing operator efficiency and reduce costs associated with machine operation, such as fuel and labor costs.

At step 402, the pressure sensor 204 is provided in a tie-line associated with the pneumatic cylinder 202. Thereafter, at step 404, the controller 302 may receive the signal indicative of the pressure exerted on the pneumatic cylinder 202 from the pressure sensor 204. At step 406, the controller 302 may determine the compaction weight of the pneumatic compactor 102 based on the received signal, the weight distribution on the pneumatic compactor 102, and the fixed volume of the pneumatic cylinder 202.

The controller 302 may correlate the compaction weight of the pneumatic compactor 102 with the received signal, the weight distribution on the pneumatic compactor 102, and the fixed volume of the pneumatic cylinder 202, based on the look-up of the pre-calibrated reference map stored in the database 304. Alternatively, the controller 302 may compute the compaction weight based on the mathematical function or equation involving these factors. Further, the controller 302 may determine the number of passes required to be made by the pneumatic compactor 102 based on the determined compaction weight. In one embodiment, the compaction weight and/or the number of passes may be displayed to the operator.

It should be understood that in general, the present disclosure may prove particularly useful for the pneumatic compactor 102. It may also be useful for other industrial machines, including but not limited to certain loaders and various work machines used in construction, agriculture, and industrial environments.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A weight sensing system for a pneumatic compactor, the weight sensing system comprising:
    a pressure sensor in communication with a pneumatic cylinder, the pressure sensor configured to generate a signal indicative of a pressure exerted on the pneumatic cylinder;
    a controller communicably coupled to the pressure sensor, the controller configured to:
        receive the signal indicative of the pressure exerted on the pneumatic cylinder; and
        determine a compaction weight of the pneumatic compactor based on the received signal, a weight distribution on the pneumatic compactor, and a fixed volume of the pneumatic cylinder.

2. The weight sensing system of claim 1, wherein the weight distribution on the pneumatic compactor is based on a fixed weight of the pneumatic compactor and a ballast weight.

3. The weight sensing system of claim 1, wherein the controller is configured to correlate the received signal with the weight distribution on the pneumatic compactor and the fixed volume of the pneumatic cylinder to determine the compaction weight.

4. The weight sensing system of claim 3, wherein the correlation further comprises looking-up of a pre-calibrated reference map including the compaction weight against one or more pressure readings, the weight distribution on the pneumatic compactor, and the fixed volume of the pneumatic cylinder.

5. The weight sensing system of claim 1, wherein the controller is configured to compute the compaction weight based on the received signal, the weight distribution on the pneumatic compactor, and a fixed volume of the pneumatic cylinder.

6. The weight sensing system of claim 1 further comprising a display unit communicably coupled to the controller, the display unit configured to display the compaction weight of the pneumatic compactor.

7. The weight sensing system of claim 1, wherein the pressure sensor is provided in a tie-line connecting a front pair of the pneumatic cylinders.

8. The weight sensing system of claim 1, wherein the controller is provided proximate to a rear end of the pneumatic compactor.

9. The weight sensing system of claim 1, wherein the controller is further configured to determine a number of passes required to compact a surface based on the determined compaction weight and a compaction surface type.

10. A method comprising:
    providing a pressure sensor in communication with a pneumatic cylinder;
    receiving, from the pressure sensor, a signal indicative of a pressure exerted on the pneumatic cylinder; and
    determining a compaction weight of a pneumatic compactor based, at least in part, on the received signal, a weight distribution on the pneumatic compactor, and a fixed volume of the pneumatic cylinder.

11. The method of claim 10, wherein the weight distribution on the pneumatic compactor is based on a fixed weight of the pneumatic compactor and a ballast weight.

12. The method of claim 10, wherein determining the compaction weight further comprises correlating the received signal with the weight distribution on the pneumatic compactor and the fixed volume of the pneumatic cylinder.

13. The method of claim 10, wherein the correlation further comprises looking-up of a pre-calibrated reference map including the compaction weight against one or more pressure readings, the weight distribution on the pneumatic compactor, and the fixed volume of the pneumatic cylinder.

14. The method of claim 10, wherein determining the compaction weight further comprises computing the compaction weight based on the received signal, the weight distribution on the pneumatic compactor, and the fixed volume of the pneumatic cylinder.

15. The method of claim 10 further comprising displaying the determined compaction weight of the pneumatic compactor.

16. The method of claim 10 further comprising determining a number of passes required to compact a surface based on the determined compaction weight and a compaction surface type.

17. A pneumatic compactor comprising:
    a power source;
    a pair of front and rear suspension tires;
    a pair of pneumatic cylinders associated with each of the pair of front and rear suspension tires;
    a pressure sensor in communication with at least one of the pair of the pneumatic cylinders, the pressure sensor configured to generate a signal indicative of a pressure exerted on the pneumatic cylinder;

a controller communicably coupled to the pressure sensor, the controller configured to:
  receive the signal indicative of the pressure exerted on the pneumatic cylinder; and
  determine a compaction weight of the pneumatic compactor based, at least in part, on the received signal, a weight distribution on the pneumatic compactor, and a fixed volume of the pneumatic cylinder; and
a display unit configured to display the determined compaction weight of the pneumatic compactor.

18. The pneumatic compactor of claim 17, wherein the weight distribution on the pneumatic compactor is based on a fixed weight of the pneumatic compactor and a ballast weight.

19. The pneumatic compactor of claim 17, wherein the controller is further configured to correlate the received signal with the weight distribution on the pneumatic compactor and the fixed volume of the pneumatic cylinder to determine the compaction weight.

20. The pneumatic compactor of claim 17, wherein the controller is further configured to compute the compaction weight based on the received signal, the weight distribution on the pneumatic compactor, and the fixed volume of the pneumatic cylinder.

* * * * *